United States Patent
Gonzalez

(10) Patent No.: US 10,711,835 B2
(45) Date of Patent: Jul. 14, 2020

(54) TILTING PAD BEARING ASSEMBLIES; BEARING APPARATUSES AND METHODS OF USING THE SAME

(71) Applicant: US SYNTHETIC CORPORATION, Orem, UT (US)

(72) Inventor: Jair J. Gonzalez, Provo, UT (US)

(73) Assignee: US SYNTHETIC CORPORATION, Orem, UT (US)

( * ) Notice: Subject to any disclaimer, the term of this patent is extended or adjusted under 35 U.S.C. 154(b) by 0 days.

(21) Appl. No.: 16/680,182

(22) Filed: Nov. 11, 2019

(65) Prior Publication Data
US 2020/0149584 A1 May 14, 2020

Related U.S. Application Data

(63) Continuation of application No. 16/376,606, filed on Apr. 5, 2019, now Pat. No. 10,502,258, which is a
(Continued)

(51) Int. Cl.
*F16C 17/03* (2006.01)
*F16C 17/06* (2006.01)
(Continued)

(52) U.S. Cl.
CPC .............. *F16C 17/06* (2013.01); *F16C 17/03* (2013.01); *F16C 33/043* (2013.01); *F16C 33/24* (2013.01);
(Continued)

(58) Field of Classification Search
CPC ........ F16C 17/03; F16C 17/035; F16C 17/06; F16C 17/065; F16C 32/067; F16C 33/043; F16C 33/24; F16C 2352/00
See application file for complete search history.

(56) References Cited

U.S. PATENT DOCUMENTS

| 3,829,180 A | 8/1974 | Gardner |
| 5,033,871 A | 7/1991 | Ide |

(Continued)

FOREIGN PATENT DOCUMENTS

| WO | 2012145217 A1 | 10/2012 |
| WO | 2014189763 A1 | 11/2014 |
| WO | 2017034787 A1 | 3/2017 |

OTHER PUBLICATIONS

International Search Report and Written Opinion for International Application No. PCT/US2016/046014 dated Oct. 26, 2016.
(Continued)

*Primary Examiner* — Phillip A Johnson
(74) *Attorney, Agent, or Firm* — Dorsey & Whitney LLP

(57) ABSTRACT

Embodiments disclosed herein are directed to tilting pad bearing assemblies and bearing apparatuses using the same. As will be discussed in more detail below, the tilting pad bearing assemblies include a plurality of tilting pads. The tilting pads include at least one or more first tilting pads and one or more second tilting pads. Each of the first tilting pads includes a first superhard bearing surface having a first material. Each of the second tilting pads includes a second bearing surface having a second material. The first material includes a superhard material and the second material includes a material that is different than the first material.

20 Claims, 9 Drawing Sheets

Related U.S. Application Data continuation of application No. 15/747,362, filed as application No. PCT/US2016/046014 on Aug. 8, 2016, now Pat. No. 10,294,986.

(60) Provisional application No. 62/209,842, filed on Aug. 25, 2015.

(51) Int. Cl.
  *F16C 33/24* (2006.01)
  *F16C 33/04* (2006.01)

(52) U.S. Cl.
  CPC ...... *F16C 2202/04* (2013.01); *F16C 2206/56* (2013.01); *F16C 2206/58* (2013.01); *F16C 2352/00* (2013.01)

(56) References Cited

U.S. PATENT DOCUMENTS

| | | |
|---|---|---|
| 7,896,551 B2 | 3/2011 | Cooley et al. |
| 8,967,871 B2 | 3/2015 | Sexton et al. |
| 2008/0253706 A1 | 10/2008 | Bischof et al. |
| 2010/0260451 A1 | 10/2010 | Wilkes |
| 2012/0281938 A1 | 11/2012 | Peterson et al. |
| 2013/0192899 A1* | 8/2013 | Cooley ............... F16C 17/03 175/92 |
| 2014/0023301 A1 | 1/2014 | Sexton et al. |
| 2014/0348452 A1 | 11/2014 | Gonzalez et al. |
| 2016/0265586 A1 | 9/2016 | Hird |
| 2018/0216661 A1 | 8/2018 | Gonzalez |

OTHER PUBLICATIONS

Issue Notification for U.S. Appl. No. 15/747,362 dated May 1, 2019.
Non-Final Office Action for U.S. Appl. No. 16/376,606 dated Apr. 29, 2019.
Notice of Allowance for U.S. Appl. No. 15/747,362 dated Jan. 9, 2019.
Notice of Allowance for U.S. Appl. No. 16/376,606 dated Aug. 13, 2019.
U.S. Appl. No. 13/734,354, filed Jan. 4, 2013.
U.S. Appl. No. 14/134,841, filed Dec. 19, 2013.
U.S. Appl. No. 15/747,362, filed Jan. 24, 2018.
U.S. Appl. No. 61/948,970, filed Mar. 6, 2014.
U.S. Appl. No. 62/002,001, filed May 22, 2014.
U.S. Appl. No. 62/209,842, filed Aug. 25, 2015.

* cited by examiner

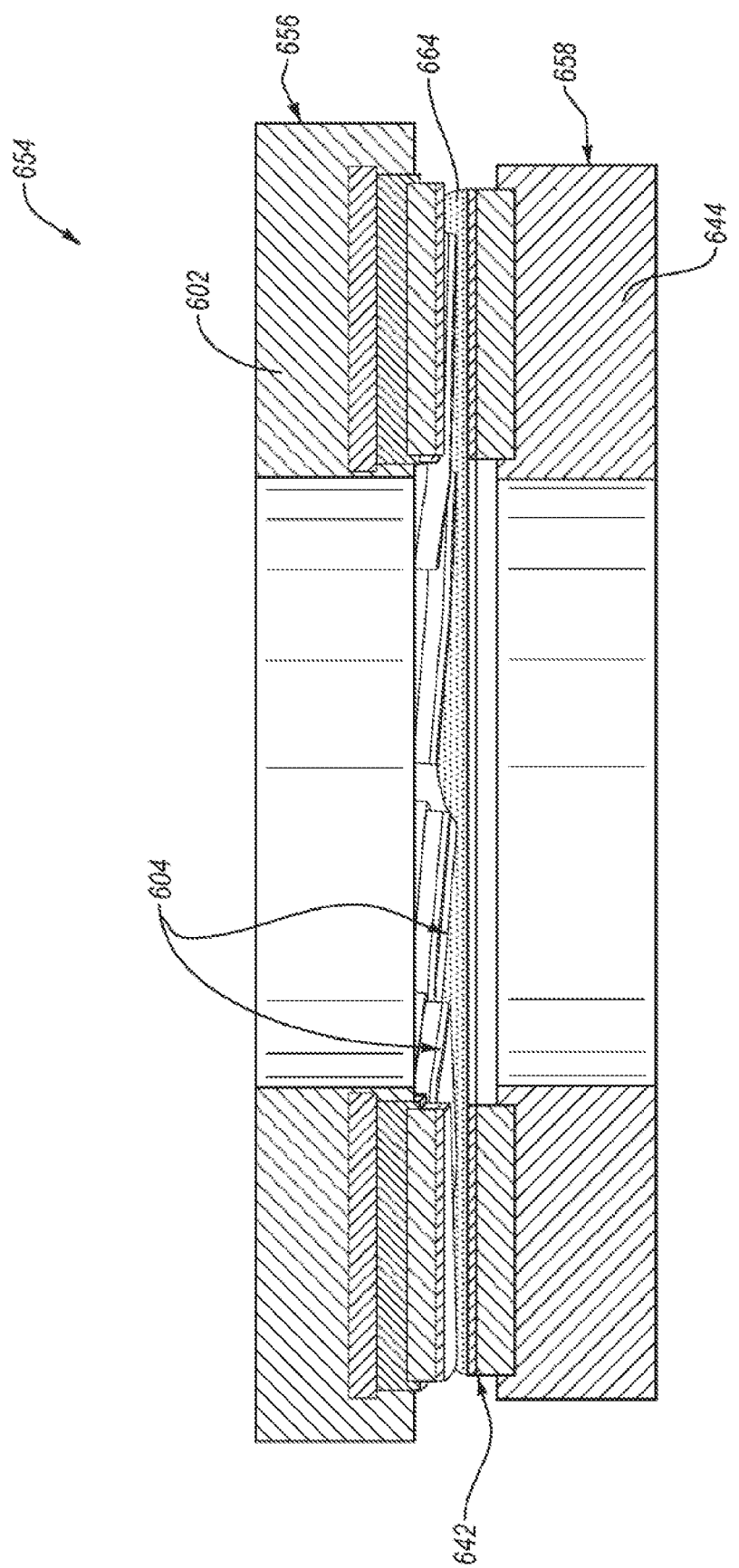

TILTING PAD BEARING ASSEMBLIES; BEARING APPARATUSES AND METHODS OF USING THE SAME

CROSS-REFERENCE TO RELATED APPLICATIONS

This application is a continuation of U.S. application Ser. No. 16/376,606 filed Apr. 5, 2019, which is a continuation of U.S. application Ser. No. 15/747,362 (now U.S. Pat. No. 10,294,986 issued May 21, 2019) filed on Jan. 24, 2018, which is a U.S. national stage of PCT International Application No. PCT/US2016/046014 filed on Aug. 8, 2016, which claims priority to U.S. Provisional Patent Application No. 62/209,842 filed on Aug. 25, 2015, the disclosure of each of which is incorporated herein, in its entirety, by this reference.

BACKGROUND

Wear-resistant, superhard compacts are utilized in a variety of mechanical applications. For example, polycrystalline diamond compacts ("PDCs") are used in drilling tools (e.g., cutting elements, gage trimmers, etc.), machining equipment, bearing apparatuses, wire-drawing machinery, and in other mechanical apparatuses.

PDCs and other superhard compacts have found particular utility as superhard bearing elements in thrust bearings within pumps, turbines, subterranean drilling systems, motors, compressors, generators, gearboxes, and other systems and apparatuses. For example, a PDC bearing element typically includes a superhard polycrystalline diamond layer that is commonly referred to as a diamond table. The diamond table is formed and bonded to a substrate using a high-pressure/high-temperature ("HPHT") process.

A thrust-bearing apparatus includes a number of superhard bearing elements affixed to a support ring. The superhard bearing elements (e.g., a PDC bearing element) bear against other superhard bearing elements of an adjacent bearing assembly during use. Superhard bearing elements are typically brazed directly into a preformed recess formed in a support ring of a fixed-position thrust bearing.

Despite the availability of a number of different bearing apparatuses including such PDCs and/or other superhard materials, manufacturers and users of bearing apparatuses continue to seek bearing apparatuses that exhibit improved performance characteristics, lower cost, or both.

SUMMARY

Embodiments disclosed herein are directed to tilting pad bearing assemblies and bearing apparatuses using the same. As will be discussed in more detail below, the tilting pad bearing assemblies include a plurality of tilting pads. The plurality of tilting pads include one or more first tilting pads and one or more second tilting pads. Each of the first tilting pads includes a bearing surface having a first material. Each of the second tilting pads includes a bearing surface having a second material. The first material includes a superhard material and the second material includes a material that is different than the first material. Such a configuration enables the tilting pad bearing assembly to have the benefits of a tilting pad bearing assembly including bearing surfaces having the first material (e.g., a relatively harder first material) and a tilting pad bearing assembly including bearing surfaces having the second material (e.g., a relatively less hard second material).

In an embodiment, a bearing assembly is disclosed. The bearing assembly includes a support ring. The bearing assembly also includes a plurality of tilting pads distributed circumferentially about an axis. Each of the plurality of tilting pads are tilted and/or tiltably secured relative to the support ring. The plurality of tilting pads includes one or more of first tilting pads. Each of the one or more first tilting pads includes a first superhard bearing surface having a first material. The first material includes a superhard material. The plurality of tilting pads further includes one or more of second tilting pads that are distinct from the one or more first tilting pads. Each of the one or more second tilting pads includes a second bearing surface having a second material. The second material is different than the first material.

In an embodiment, a bearing apparatus is disclosed. The bearing apparatus includes a first bearing assembly. The first bearing assembly includes a first support ring. The first bearing assembly further includes one or more bearing elements extending about an axis. The one or more bearing elements include a bearing surface. The one or more bearing elements are secured to the first support ring. The bearing apparatus further includes a second bearing assembly. The second bearing assembly includes a second support ring. The second bearing assembly further includes a plurality of tilting pads distributed circumferentially about an axis. Each of the plurality of tilting pads are tilted and/or tiltably secured relative to the second support ring. The plurality of tilting pads includes one or more of first tilting pads. Each of the one or more first tilting pads includes a first superhard bearing surface having a first material. The first material includes a superhard material. The plurality of tilting pads further includes one or more of second tilting pads that are distinct from the one or more first tilting pads. Each of the one or more second tilting pads includes a second bearing surface. Each second bearing surface includes a second material. The second material is different than the first material.

In an embodiment, a method of operating a bearing apparatus is disclosed. The method includes rotating a rotor relative to a stator. At least one of the stator or the rotor includes a first support ring and one or more bearing elements. The one or more bearing elements extend about an axis. The one or more bearing elements are secured to the first support ring. The other of the stator or the rotor includes a second support ring and a plurality of tilting pads distributed circumferentially about an axis. Each of the plurality of tilting pads are tilted and/or tiltably secured relative to the second support ring. The plurality of tilting pads includes one or more first tilting pads. Each of the one or more first tilting pads includes a first superhard bearing surface having a first material. The first material includes a superhard material. The plurality of tilting pads further including one or more second tilting pads that are distinct from the one or more first tilting pads. Each of the one or more second tilting pads includes a second bearing surface having a second material. The second material includes a material that is different than the first material.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the present disclosure, wherein identical reference numerals refer to identical or similar elements or features in different views or embodiments shown in the drawings.

FIGS. 6A and 6B are isometric cross-sectional views, respectively, of a thrust-bearing apparatus, according to an embodiment.

DETAILED DESCRIPTION

Embodiments disclosed herein are directed to tilting pad bearing assemblies and bearing apparatuses using the same. As will be discussed in more detail below, the tilting pad bearing assemblies include a plurality of tilting pads. The tilting pads include one or more first tilting pads and one or more second tilting pads. In an embodiment the second tilting pads are distinct from the first tilting pads. For example, each of the first tilting pads includes a first superhard bearing surface having a first material. In such an example, each of the second tilting pads includes a second bearing surface having a second material. The first material includes a superhard material and the second material includes a material that is different than the first material. Such a configuration may enable the tilting pad bearing assembly to have the benefits of a tilting pad bearing assembly including bearing surfaces having the first material and a tilting pad bearing assembly including bearing surfaces having the second material. For example, the first tilting pads may include a relatively harder first material to enable the first tilting pads to exhibit a higher load capacity than the one or more second tilting pads that may include a relatively less hard second material (e.g., steel, a polymer, or combinations thereof). However, the relatively less hard second material may enable the second bearing surfaces to exhibit one or more properties that are different than the first superhard bearing surfaces (e.g., easier to machine, easier to embed additional materials therein, relatively cheaper than the relatively harder first material, exhibit better conformity than the relatively hard first material to another bearing surface, or combinations thereof).

The tilting pad bearing assembly and bearing apparatus embodiments disclosed herein may be employed in subterranean drilling assemblies, pumps, compressors, turbo expanders, or other mechanical systems. Motor assemblies including at least one such bearing assembly or bearing apparatus are also disclosed, as well as methods of fabricating and using such bearing assemblies or bearing apparatuses.

While the description herein provides examples relative to a subterranean drilling and motor assembly, the tilting pad bearing assembly and apparatus embodiments disclosed herein may be used in any number of applications. For example, the bearing assemblies and apparatuses may be used in a pump, turbine bearing apparatus, motor, compressor, generator, gearbox, and other systems and apparatuses, or in any combination of the foregoing. Furthermore, the bearing assemblies and apparatuses may also be operated in hydrodynamic, or mixed-mode or boundary (e.g., rubbing or sliding) lubrication regimes, if desired or needed.

Figure 1A:
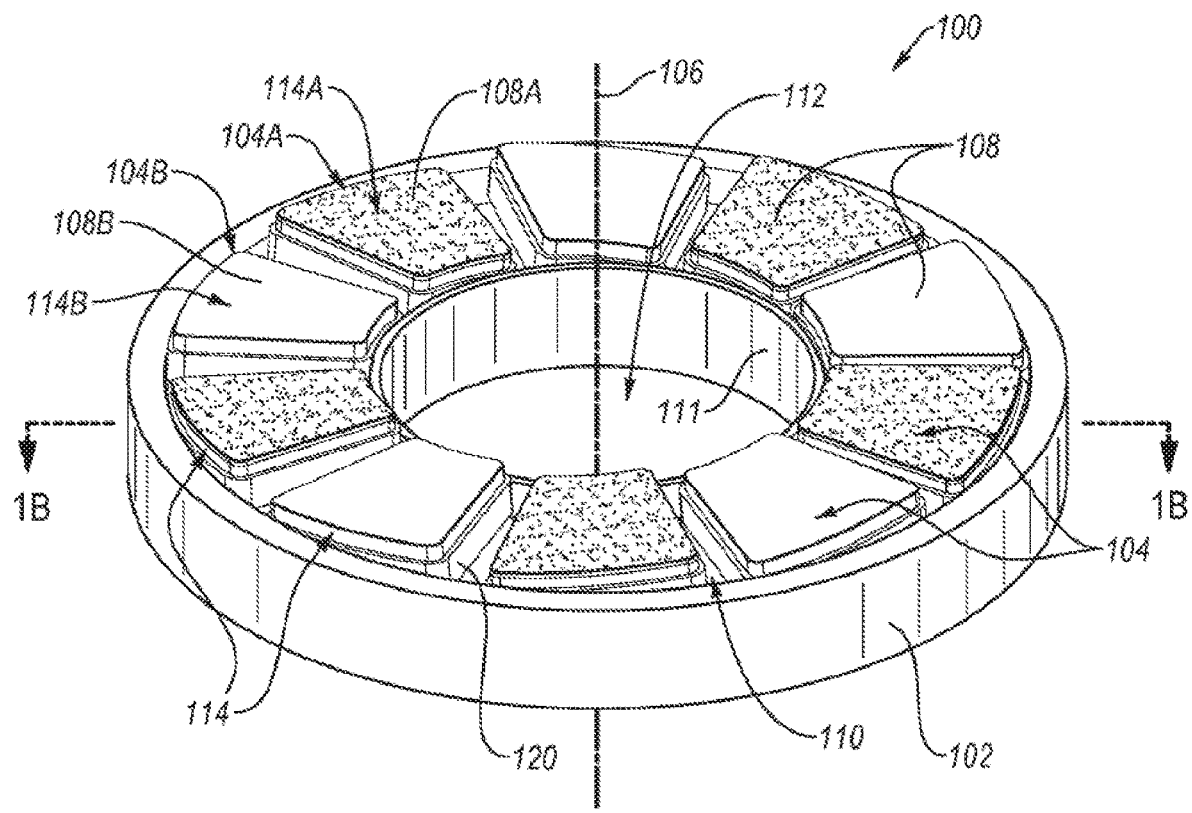
FIGS. 1A and 1B are isometric and isometric cross-sectioned views, respectively, of a tilting pad thrust-bearing assembly, according to an embodiment.
Figure 1B:
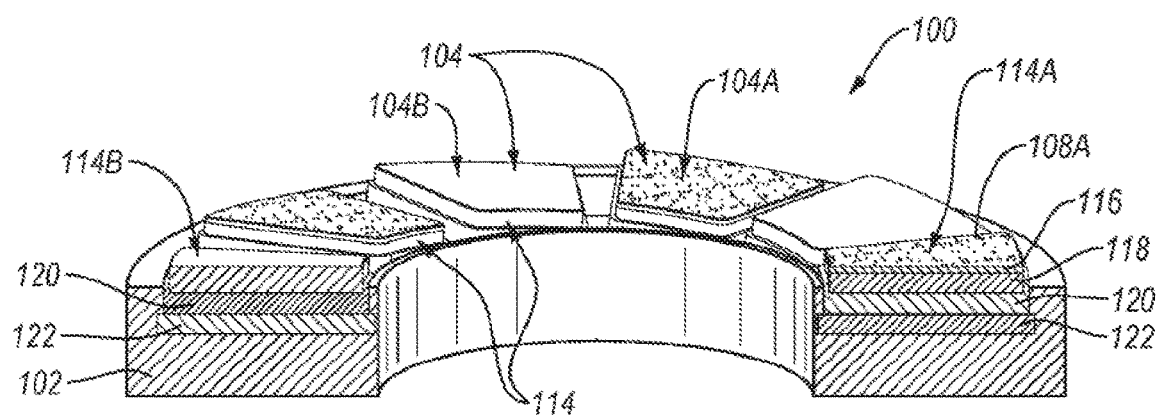

FIGS. 1A and 1B are isometric and isometric cross-sectioned views, respectively, of a tilting pad thrust-bearing assembly 100, according to an embodiment. The thrust-bearing assembly 100 includes a support ring 102 that carries a plurality of tilting pads 104. The tilting pads 104 may be circumferential spaced from each other about a thrust axis 106. The tilting pads 104 includes one or more first tilting pads 104A and one or more second tilting pads 104B. The second tilting pads 104B are distinct from the first tilting pads 104A. Each of the first tilting pads 104A includes a first superhard bearing surface 108A comprising a first material. The first material includes a superhard material. Each of the second tilting pads 104B includes a second bearing surface 108B comprising a second material. The second material is different from the first material (e.g., in composition, properties and/or structure).

In an embodiment, the support ring 102 may include a channel 110 and the tilting pads 104 may be placed within the channel 110. In another embodiment, the support ring 102 may define multiple pockets or otherwise define locations for the tilting pads 104. The tilting pads 104 may be tilted and/or tiltably secured relative to the support ring 102 in any suitable manner. For example, as discussed hereafter, a pivotal connection may be used to secure the plurality of tilting pad 104 to the support ring 102, although any other suitable securement or attachment mechanism may be utilized. The support ring 102 may include an inner, peripheral surface 111 defining a hole 112. The hole 112 may be generally centered about the thrust axis 106, and may be configured to receive a shaft (e.g., a downhole drilling motor shaft, not shown). The support ring 102 may be made from a variety of different materials (e.g., metals metal alloys, cemented carbides, any suitable material, or combinations thereof). For example, the support ring 102 may comprise carbon steel, stainless steel, copper (e.g., brass or bronze alloys), tungsten carbides, or another suitable material.

The tilting pads 104 may include at least one of fixed tilting pads, adjustable tilting pads, or self-establishing tilting pads. In an embodiment, each of the tilting pads 104 may be located circumferentially adjacent to another tilting pad 104 with a circumferential space or other offset therebetween. For example, the circumferential space may be about 2.0 mm to about 20.0 mm. In another example, the circumferential space may be less than about 2.0 mm or greater than about 20 mm. In another embodiment, the thrust-bearing assembly 100 may include 3 to 20 tilting pads, such as 5 to 12 tilting pads, or 10 to 18 tilting pads. In another embodiment, the thrust-bearing assembly 100 may include more than 20 tilting pads.

In an embodiment, each of the tilting pads 104 (e.g., first tilting pads 104A, second tilting pads 104B) may include a bearing element 114 (e.g., first superhard bearing element 114A, second bearing element 114B) having a bearing surface 108 (e.g., first superhard bearing surface 108A, second bearing surface 108B). Collectively, the bearing surfaces 108 of the tilting pads 104 provide a non-continuous bearing surface. In the illustrated embodiment, each bearing surface 108 of the tilting pads 104 may exhibit a generally truncated pie-shaped geometry, a generally circular geometry, or a generally trapezoidal geometry. However, in other embodiments, each bearing surface 108 may exhibit any suitable geometry.

As previously discussed, the plurality of tilting pads 104 may include one or more first tilting pads 104A and one or more second tilting pads 104B. Each of the first tilting pads 104A includes a first superhard bearing element 114A having a first superhard bearing surface 108A. Each first superhard bearing surface 108A of the first tilting pads 104A includes at least a first material. The first material may include one or more superhard materials. The term "superhard" means a material having a hardness at least equal to the hardness of tungsten carbide.

In an embodiment, the first material may include polycrystalline cubic boron nitride, polycrystalline diamond (e.g., formed by chemical vapor deposition or by HPHT sintering), silicon carbide, silicon nitride, tantalum carbide, tungsten carbide (e.g., binderless tungsten carbide, cobalt-cemented tungsten carbide), boron carbide, other metal carbides, other superhard ceramic carbides, or combinations thereof. In another embodiment, the first material may comprise a reaction-bonded ceramic, such as reaction-bonded silicon nitride, reaction bonded silicon nitride, or another suitable reaction bonded ceramic. The reaction-bonded ceramic may have additional materials at least partially embedded therein. For example, the additional materials may include diamond, polycrystalline diamond, cubic boron nitride, a material exhibiting a hardness greater than the reaction bonded ceramic, a material exhibiting a thermal conductivity greater than the reaction bonded ceramic, or combinations thereof. For example, diamond may be added to the reaction bonded ceramic in an amount less than about 80 weight % (e.g., about 80 weight % to about 50 weight %, about 50 weight % to about 25 weight %, less than about 25 weight %). The additional materials in the reaction bonded ceramic may improve the thermal conductivity and/or wear resistance of the first superhard bearing element 114A of the first tilting pads 104A. In an embodiment, the first material may include a superhard coating applied to a superhard or non-superhard material.

Referring to FIG. 1B, the first superhard bearing elements 114A of the first tilting pads 104A may include a superhard table 116 defining the first superhard bearing surface 108A. The superhard table 116 may be bonded to a substrate 118. In an embodiment, the first superhard bearing element 114A may comprise a polycrystalline diamond compact ("PDC") including a polycrystalline diamond ("PCD") table defining the superhard table 116 to which the substrate 118 is bonded. For example, the substrate 118 may comprise a cobalt-cemented tungsten carbide substrate bonded to a PCD table. The PCD table includes a plurality of directly bonded-together diamond grains exhibiting diamond-to-diamond bonding therebetween (e.g., $sp^3$ bonding), which define a plurality of interstitial regions. A portion of, or substantially all of, the interstitial regions of the PCD table may include a metal-solvent catalyst or a metallic infiltrant disposed therein that is infiltrated from the substrate 118 or from another source during fabrication. For example, the metal-solvent catalyst or metallic infiltrant may be selected from iron, nickel, cobalt, and alloys of the foregoing. The PCD table may further including thermally-stable diamond in which the metal-solvent catalyst or metallic infiltrant has been partially or substantially completely depleted from a selected surface or volume of the PCD table, for example via an acid leaching process. Thermally-stable PCD may also be sintered with one or more alkali metal catalysts.

In an embodiment, the PDC including a PCD table bonded to a substrate 118 may be formed in an HPHT process. For example, diamond particles may be disposed adjacent to the substrate 118, and subjected to an HPHT process to sinter the diamond particles to form the PCD table and bond the PCD table to the substrate 118, thereby forming the PDC. The temperature of the HPHT process may be at least about 1000° C. (e.g., about 1200° C. to about 1600° C.) and the cell pressure of the HPHT process may be at least about 4.0 GPa (e.g., about 5.0 GPa to about 12 GPa or about 7.5 GPa to about 11 GPa) for a time sufficient to sinter the diamond particles.

The diamond particles may exhibit an average particle size of about 50 μm or less, such as about 30 μm or less, about 20 μm or less, about 10 μm to about 18 μm, or about 15 μm to about 18 μm. In some embodiments, the average particle size of the diamond particles may be about 10 μm or less, such as about 2 μm to about 5 μm or submicron. In some embodiments, the diamond particles may comprise a relatively larger size and at least one relatively smaller size. As used herein, the phrases "relatively larger" and "relatively smaller" refer to particle sizes (by any suitable method) that differ by at least a factor of two (e.g., 30 μm and 15 μm). According to various embodiments, the mass of diamond particles may include a portion exhibiting a relatively larger size (e.g., 30 μm, 20 μm, 15 μm, 12 μm, 10 μm, 8 μm) and another portion exhibiting at least one relatively smaller size (e.g., 6 μm, 5 μm, 4 μm, 3 μm, 2 μm, 1 μm, 0.5 μm, less than 0.5 μm, 0.1 μm, less than 0.1 μm). In one embodiment, the diamond particles may include a portion exhibiting a relatively larger size between about 10 μm and about 40 μm and another portion exhibiting a relatively smaller size between about 1 μm and 4 μm. In some embodiments, the diamond particles may comprise three or more different sizes (e.g., one relatively larger size and two or more relatively smaller sizes), without limitation. The PCD table so-formed after sintering may exhibit an average diamond grain size that is the same or similar to any of the foregoing diamond particle sizes and distributions.

More details about diamond particle sizes and diamond particle size distributions that may be employed are disclosed in U.S. patent application Ser. No. 13/734,354; U.S. Provisional Patent Application No. 61/948,970; and U.S. Provisional Patent Application No. 62/002,001. The disclosure of each of U.S. patent application Ser. No. 13/734,354; U.S. Provisional Patent Application No. 61/948,970; and U.S. Provisional Patent Application No. 62/002,001 is incorporated herein, in its entirety, by this reference.

In an embodiment, the superhard table 116 may be integrally formed with the substrate 118. For example, the superhard table 116 may be a sintered PCD table that is integrally formed with the substrate 118. In another embodiment, the superhard table 116 may be a pre-formed superhard table that has been HPHT bonded to the substrate 118 in a second HPHT process after being initially formed in a first HPHT process. For example, the superhard table 116 may be a pre-formed PCD table that has been leached to substantially completely remove the metal-solvent catalyst used in the manufacture thereof and subsequently HPHT bonded or brazed to the substrate 118 in a separate process.

In some embodiments, the superhard table 116 may be leached to deplete a metal-solvent catalyst or a metallic infiltrant therefrom in order to enhance the thermal stability of the superhard table 116. For example, when the superhard table 116 is a PCD table, the superhard table 116 may be leached to remove at least a portion of the metal-solvent catalyst from a working region thereof to a selected depth to form a leached thermally-stable region. The leached thermally-stable region may extend inwardly from the first superhard bearing surface 108A to a selected depth. In an embodiment, the depth of the thermally-stable region may be about 10 μm to about 600 μm. More specifically, in some embodiments, the selected depth is about 50 μm to about 100 μm, about 100 μm to about 350 μm, or about 350 μm to about 600 μm. The leaching may be performed in a suitable acid, such as aqua regia, nitric acid, hydrofluoric acid, or mixtures of the foregoing.

The substrate 118 may be formed from any number of different materials, and may be integrally formed with, or otherwise bonded or connected to, the superhard table 116. Materials suitable for the substrate 118 may include, without limitation, cemented carbides, such as tungsten carbide, titanium carbide, chromium carbide, niobium carbide, tantalum carbide, vanadium carbide, or combinations thereof cemented with iron, nickel, cobalt, or alloys thereof. For example, in an embodiment, the substrate 118 comprises cobalt-cemented tungsten carbide. However, in certain embodiments, the superhard tables 116 may be omitted, and the first superhard bearing elements 114A of the first tilting pads 104A may be made from a wear-resistant material, such as cobalt-cemented tungsten carbide. In other embodiments, the substrate 118 may be omitted and the first superhard bearing elements 114A of the first tilting pads 104A may be a superhard material, such as a polycrystalline diamond body.

As previously discussed, the plurality of tilting pads 104 further include the one or more second tilting pads 104B. The second tilting pads 104B may include a second bearing element 114B having a second bearing surface 108B. Each of the second bearing surfaces 108B may include a second material. The second material may be any material that is different from the first material of the one or more first tilting pads 104A. In an embodiment, the second material may include one or more superhard materials. For example, the second material can include a superhard table bonded to a substrate. Alternatively, the substrate can be omitted. In another embodiment, the second material may include one or more non-superhard materials. In an embodiment, the first material exhibits a hardness that is greater than the hardness of the second material. In another embodiment, the first material exhibits at least one of a wear resistance, thermal conductivity, or toughness that is greater than the second material, or vice versa.

In an embodiment, the first material and the second material may both include superhard materials that are substantially similar in composition). For example, the first material and the second material may both include a PCD table defining the bearing surfaces 108A and 108B, respectively. However, the first material may include a PCD table formed from relatively fine diamond grains while the second material may include a PCD table formed from relatively coarse diamond grains. As such, the thrust-bearing assembly 100 may exhibit relatively good wear-resistance from the relatively finer diamond grains and relatively good toughness from the relatively coarser diamond grains. Alternatively, the first material includes a PCD table formed at relatively high HPHT pressures, while the second material includes a PCD table formed at relatively low HPHT pressures.

In an embodiment, the first material and the second material may both include one or more materials, and the first material and the second material may include at least one material that exhibits a substantially similar composition. However, one of the first material or the second material may include at least one additional material therein that the other of the first material or the second material does not include. For example, both the first material and the second material may include a PCD table. However, the first material may include a cobalt metal-solvent catalyst at least partially occupying the interstitial regions thereof while the second material may include a nickel metal-solvent catalyst at least partially occupying the interstitial regions thereof. In another example, both the first and second material may include a substantially similar reaction bonded ceramic. However, the first material may include at least one additional material therein (e.g., diamond), while the second material includes a different additional material therein or does not include the at least one additional material therein. In an embodiment, the first material may include a leached PCD body or table, while the second material includes an unleached PDC body or table.

In another embodiment, the first material and the second material may be substantially the same initially. However, the first material may be modified or treated such that at least a portion of the first material is chemically and/or structurally different from the second material. For example, the first material and the second material may include a PCD body or table that includes a metal-solvent at least partially occupying interstitial regions thereof. However, at least a portion of the first material may be leached to remove at least a portion of the metal-solvent catalyst therefrom. In another embodiment, the first material and the second material may include a PCD table that includes a metal-solvent at least partially occupying interstitial regions thereof. However, at least a portion of the first material may have at least one alloying element (e.g., boron, phosphorus, or combinations thereof) diffused into and/or alloyed with the metal-solvent catalyst to form an alloy. In another example, the first material and the second material may include an at least partially leached PCD table. However, at least a portion of the first material may be backfilled with another material, such as silicon or another suitable material. In another example, the first material and the second material may include a substantially similar material. However, the first material may have a superhard material subsequently bonded thereto. For instance, a portion of the first material may be removed and the superhard material may be at least partially positioned in and bonded to the removed portion of the first material.

In an embodiment, the first superhard bearing element 114A and the second bearing element 114B may be substantially the same except that the first material may include a coating applied thereto. In another embodiment, the first superhard bearing element 114A and the second bearing element 114B may be substantially different and the first material may include a coating applied thereto. The coating may be formed using a chemical vapor deposition technique, a physical vapor deposition technique, or any other deposition technique and may, optionally, be a superhard material.

In another embodiment, the first material and the second material may both include superhard materials that are substantially chemically different materials. For example, the first material may include silicon carbide while the second material includes silicon nitride. In another example, the first material may include a PCD table while the second material includes tungsten carbide.

In another embodiment, the second material may include a non-superhard material. A non-superhard material may be any material that exhibits a hardness less than tungsten carbide. In an embodiment, the non-superhard material may include a ceramic, a polymer, or a composite. For example, the non-superhard material may include zirconia, alumina, poly(aryl ether ketones) ("PAEK") such as poly(ether ether ketone) ("PEEK"), or any other suitable ceramic, polymer, or composite. In an embodiment, the non-superhard material may include a metal, a metal alloy, a metallic material, or combinations thereof. For example, the non-superhard metal may include chromium, copper, high carbon steel, low carbon steel, stainless steel, bronze, alloys thereof, combinations thereof, or any other suitable metallic material. In an embodiment, the non-superhard metal may include a so-called "white metal." A white metal may include tin or lead alloyed with at least one of tin, lead, copper, antimony, or arsenic. For instance, the white metal may include a Babbitt metal. The white metal may include one or more additional materials at least partially embedded therein. In another embodiment, the non-superhard material may include a material that exhibits relatively high thermal conductivity, relatively low coefficient of friction, and/or relatively good corrosion resistance.

The first tilting pads 104A and the second tilting pads 104B enables the plurality of tilting pads 104 to exhibit the properties of two different bearing surfaces simultaneously. In an embodiment, the tilting pads 104 can exhibit the properties of a relatively hard bearing surface and a relatively less hard bearing surface. For example, in an embodiment, the first tilting pads 104A may include a first material that is relatively harder (e.g., polycrystalline diamond) than the relatively less hard second material (e.g., silicon carbide or white metal). The relatively hard first material may enable the first superhard bearing surfaces 108A to exhibit some properties that are different than the second bearing surfaces. For example, the first superhard bearing surfaces 108A may develop or hold a fluid film better than the second bearing surfaces 108B. Further, the relatively hard first material may exhibit better wear resistance than the second material. In another example, the relatively hard first material may enable the first tilting pads 104A to exhibit an initially higher load capacity than the one or more second tilting pads. However, the relatively less hard second material may enable the second bearing surfaces 108B to exhibit some properties that are different than the first superhard bearing surfaces 108A. For example, the relatively less hard second material may be easier to machine, easier to embed additional materials therein, and/or relatively cheaper to manufacture than the relatively harder first material. Similarly, the relatively less hard second material may exhibit better conformity than the relatively hard first material (e.g., conform better to another bearing surface). The better conformity of the relatively less hard second material may facilitate a fluid film. In another example, the relatively less hard second bearing surfaces 108B may wear-in relatively rapidly during operation of the thrust-bearing assembly 100. Worn-in bearing surfaces may exhibit relatively low coefficients of friction, compared to the non-worn-in bearing surfaces, which may enable the thrust-bearing assembly 100 to exhibit higher load capacities, require less torque to rotate, and generate less heat during operation. Additionally, wearing-in the relatively less hard second bearing surfaces 108B may enable the first superhard bearing surfaces 108A to also wear-in more rapidly. As such, the thrust-bearing assembly 100 may be configured to exhibit the benefits of having a plurality of bearing surfaces that include both the relatively hard first material and the relatively less hard second material.

Additionally, forming the plurality of bearing surfaces from at least a first material and second material may enable the tilting pads 104 to exhibit the properties of two or more different bearing materials. For example, the first material may exhibit a relatively high wear resistance and the second material may exhibit a relatively high toughness. As such, the thrust-bearing assembly 100 may include a selected combination of wear resistance and toughness. In another embodiment, the first material may exhibit a relatively high wear-resistance while the second material exhibits a relatively high thermally conductivity. As such, the thrust-bearing assembly 100 may include a selected combination of wear resistance and thermal conductivity. In another example, the first material may exhibit relatively good properties but is expensive (e.g., PCD) and the second material may exhibit relatively inferior properties but is less expensive (e.g., steel). As such, the thrust-bearing assembly 100 may include relatively desirable properties at a lower cost.

In the illustrated embodiment, each of the first superhard bearing elements 114A and the second bearing elements 114B may be secured to a support plate 120 (FIG. 1B). The support plate 120 may, for example, be formed of a metal, an alloy, a cemented carbide material, other material, or any combination thereof. In an embodiment, the first superhard bearing elements 114A and the second bearing elements 114B may be secured to the support plate 120 by brazing, welding, mechanical fastening, press-fitting, an adhesive, or another suitable method. In some embodiments, the support plate 120 may define a pocket into which the first superhard bearing elements 114A and the second bearing elements 114B may be tiltably or fixedly assembled and/or positioned. In an embodiment, the support plate 120 has an integral construction such that a single body may form substantially the entire support plate 120.

Figure 1C:
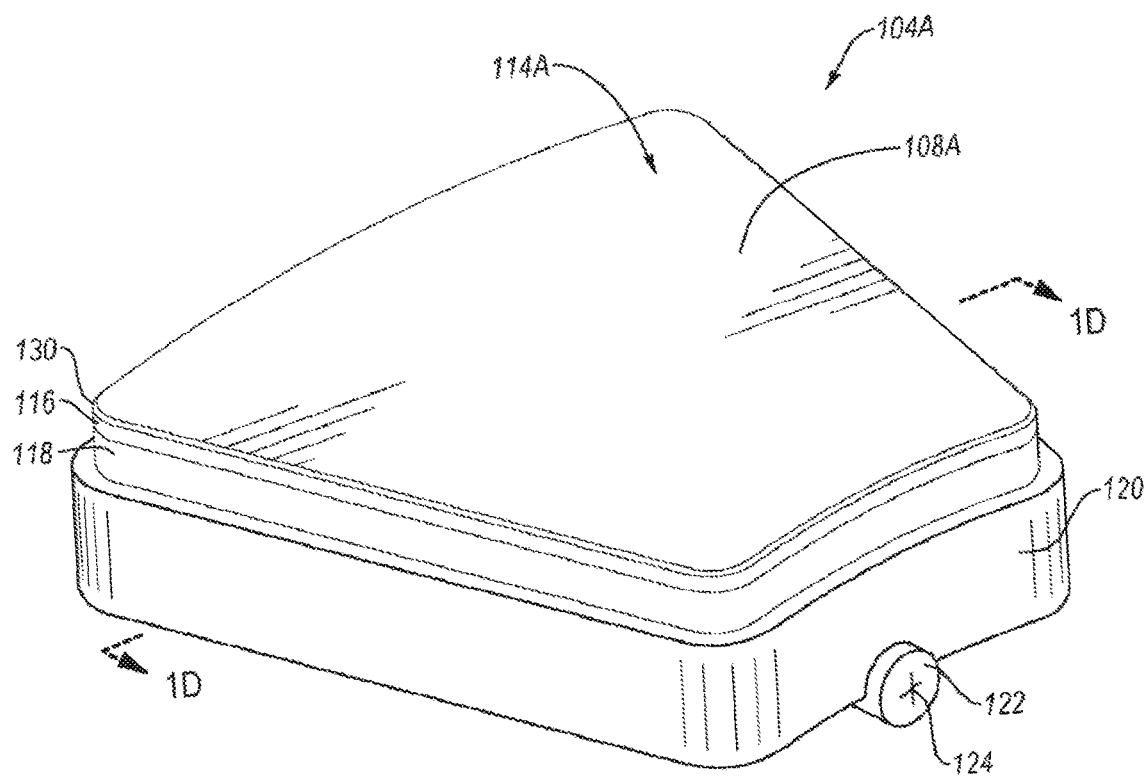
FIGS. 1C and 1D are isometric and cross-sectional views, respectively, of one of the plurality of tilting pads shown in FIGS. 1A and 1B, according to an embodiment.
Figure 1D:
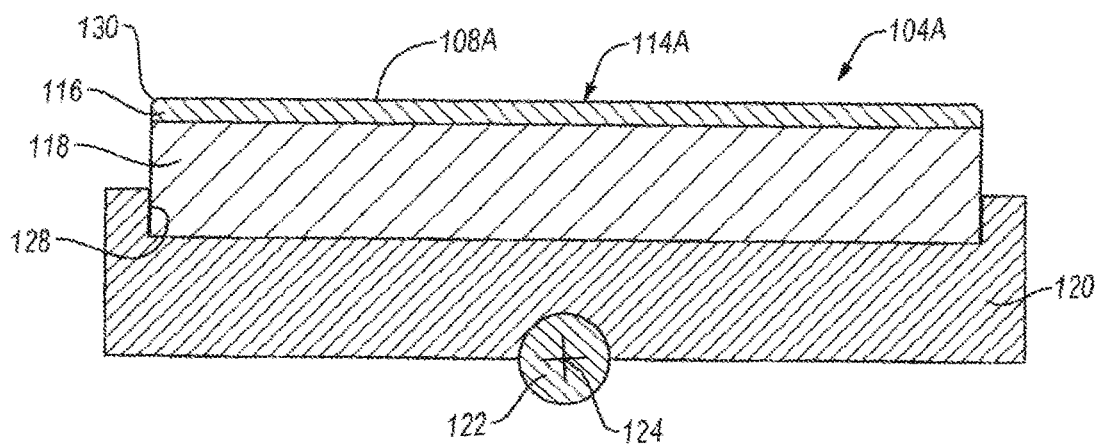

The degree to which the tilting pads 104 rotate or tilt may be varied in any suitable manner. In an embodiment, the tilting pads 104 may be tilted about respective radial axes that extend generally radially outward from the thrust axis 106. In one embodiment, the support plate 120 may be attached to a pin 122. The pin 122 may, for example, be formed of a metal, an alloy, a cemented carbide material, other material, or any combinations thereof. Referring to FIGS. 1C and 1D, the pin 122 may be allowed to at least partially rotate, or may otherwise define or correspond to a tilt axis 124. For example, according to some embodiments, the pin 122 is journaled or otherwise secured within the support ring 102 in a manner that allows the support plate 120 to rotate relative to the support ring 102. In some embodiments, the support plate 120 and/or the pin 122 may rotate or tilt from about zero to about twenty degrees about the tilt axis 124. In some embodiments, the support ring 102 may be configured for bidirectional rotation. In such an embodiment, the pin 122 may be allowed to rotate in clockwise and/or counter-clockwise directions. For example, the support plate 120 and/or the pin 122 may rotate or tilt between a positive or negative angle of about twenty degrees relative to the tilt axis 124.

Referring back to FIGS. 1A and 1B, the pin 122 may be used to allow one or more of the tilting pads 104 (e.g., the one or more first tilting pads 104A and/or the one or more second tilting pads 104B) to selectively rotate. For example, the one or more of the tilting pads 104 may be self-establishing or limiting such that the tilting pads 104 may automatically or otherwise adjust to a desired tilt or other orientation based on the operational conditions, the axial forces applied along the thrust axis 106, the rotation speed of the runner and/or the thrust-bearing assembly 100, other factors, or combinations of the foregoing. In still other embodiments, at least some of the tilting pads 104 (e.g., the first tilting pads 104A and/or the second tilting pads 104B) may be fixed at a particular tilt, or may be manually set to a particular tilt with or without being self-establishing.

Further, the pin 122 represents one embodiment of a mechanism for facilitating rotation, translation, or other positioning of the tilting pads 104. In other embodiments, other mechanisms may be used. By way of illustration, leveling links, pivotal rockers, spherical pivots, biasing elements, other elements, or any combination of the foregoing may also be used to tilt at least some of the tilting pads 104. In an embodiment, the support plate 120 may be used to facilitate rotation or tilt of a respective tilting pad 104. For example, the support plate 120 may be machined or otherwise formed to include other components, such as a spherical pivot, a pivotal rocker, or a leveling link interface. In other embodiments, the support plate 120 may be eliminated and the substrate 118 may be directly machined or otherwise formed to tilt at least some of the tilting pads 104. Examples of tilting mechanisms that may be employed are disclosed in U.S. Pat. No. 8,967,871, the disclosure of which is incorporated herein, in its entirety, by this reference.

FIGS. 1C and 1D are isometric and cross-sectional views, respectively, of one of the plurality of tilting pads 104 shown in FIGS. 1A and 1B, according to an embodiment. For example, the tilting pad may be one of the first tilting pads 104A. However, any of the principles discussed with respect to the first tilting pads 104A in relation to FIGS. 1C and 1D are applicable to the second tilting pads 104B. The first tilting pad 104A includes the first superhard bearing element 114A. In an embodiment, the first superhard bearing element 114A may include the superhard table 116 bonded to the substrate 118. The first superhard bearing element 114A may be secured to the support plate 120 by brazing, using high temperature adhesives, press-fitting, fastening with fasteners, or another suitable attachment mechanism. In the illustrated embodiment, the support plate 120 may facilitate attachment of the first superhard bearing element 114A to the support plate 120 by including an interior pocket 128. The interior pocket 128 may be sized to generally correspond to a size of the substrate 118. It is noted that the support plate 120 merely represents one embodiment for a support plate and other configurations may be used. For example, according to another embodiment, the support plate 120 may lack a pocket or other receptacle.

In the illustrated embodiment, the bearing surface 108A is substantially planar, although such an embodiment is merely illustrative. In other embodiments, the first superhard bearing surface 108A of the first superhard bearing element 114A may be curved, or have another contour or topography. Moreover, outer edges of the first superhard bearing element 114A may optionally include a chamfer 130. The chamfer 130 may extend between a side surface and a top surface of the first superhard bearing element 114A. In another embodiment, the geometries of one of the second tilting pads 104B may be configured to be substantially similar to the geometry of the first tilting pads 104A shown in FIGS. 1C and 1D.

Referring back to FIG. 1A, in the illustrated embodiment, the plurality of tilting pads 104 may include an equal number of first tilting pads 104A and second tilting pads 104B. In the illustrated embodiment, the first tilting pads 104A are positioned on the support ring 102 such that at least one first tilting pad 104A is positioned between two circumferentially adjacent second tilting pads 104B. Similarly, in an embodiment, the second tilting pads 104B may be positioned on the support ring 102 such that at least one second tilting pad 104B is positioned between two circumferentially adjacent first tilting pads 104A. In another embodiment, at least one of the first tilting pads 104A may be positioned on the support ring 102 to be circumferentially adjacent to at least one other first tilting pad 104A. Similarly, in yet a further embodiment, at least one of the second tilting pads 104B may be positioned on the support ring 102 to be circumferentially adjacent to at least one other second tilting pad 104B. The exact arrangement of the tilting pads 104 may be selected based on the size of the respective bearing surfaces (e.g., first superhard bearing surface 108A and/or second bearing surface 108B), and/or the requirements of the thrust-bearing assembly 200.

Figure 2:
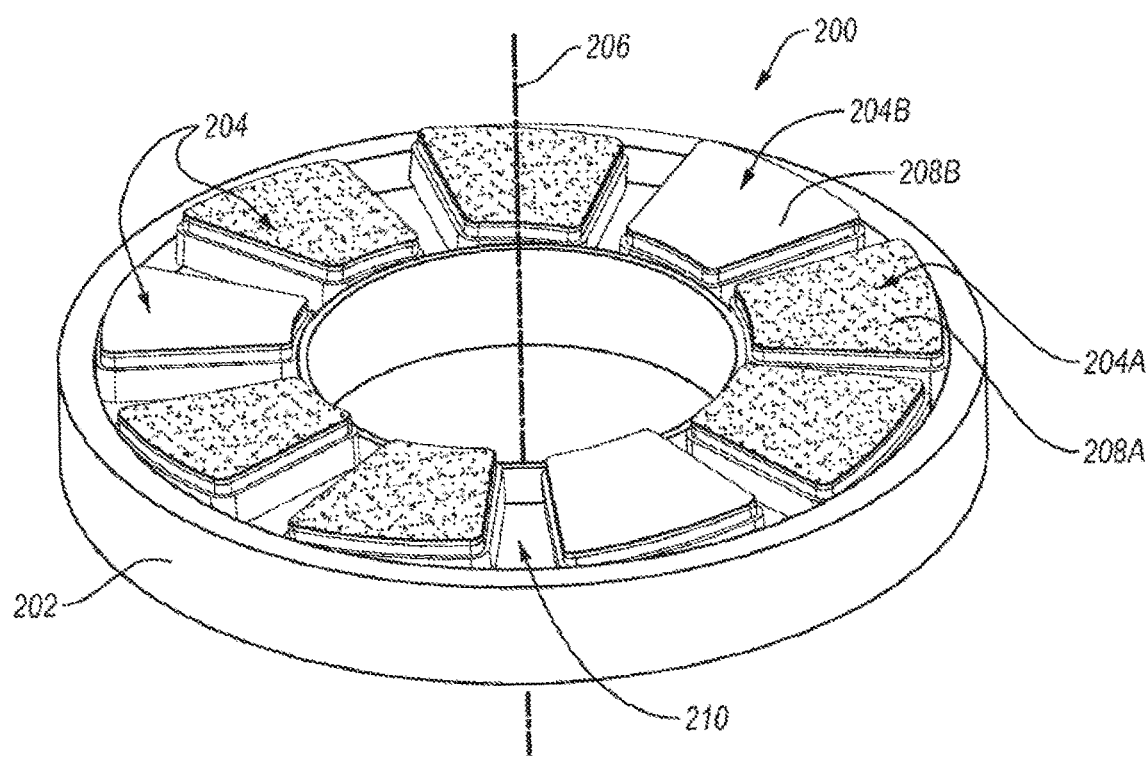
FIG. 2 is an isometric view of a tilting pad thrust-bearing assembly, according to an embodiment.

FIG. 2 is an isometric view of a tilting pad thrust-bearing assembly 200, according to an embodiment. The thrust-bearing assembly 200 may be substantially similar to the thrust-bearing assembly 100 shown in FIG. 1A. For example, the thrust-bearing assembly 200 may include a support ring 202 having a channel 210 formed therein. The channel 210 may be configured to receive a plurality of tilting pads 204. The support ring 202 may be formed from any of the support ring materials disclosed herein.

In the illustrated embodiment, the thrust-bearing assembly 200 includes one or more first tilting pads 204A and one or more second tilting pads 204B. The first tilting pads 204A may include a first superhard bearing surface 208A including a first material. The second tilting pads 204B may include a second bearing surface 208B including a second material. The first material may include a superhard material and the second material may be different than the first material.

In an embodiment, the thrust-bearing assembly 200 may include a different number of the first tilting pads 204A than the second tilting pads 204B. For example, the thrust-bearing assembly 200 may include 1.25 times to 5 times more of the first tilting pads 204A than the second tilting pads 204B, such as about 1.5 times more, 2 times more, 2.5 time more, 3 times more, or 4 times more. In another example, the thrust-bearing assembly 200 may include greater than 5 times more of the first tilting pads 204A than the second tilting pads 204B. In an embodiment, the thrust-bearing assembly 200 may include 1.25 times to 5 times more the second tilting pads 204B than the first tilting pads 204A, such as about 1.5 times more, 2 times more, 2.5 time more, 3 times more, or 4 times more. In another example, the thrust-bearing assembly 200 may include greater than 5 times more of the second tilting pads 204B than the first tilting pads 204A. The exact number of the first tilting pads 204A to the second tilting pads 204B may depend on the configuration of the thrust-bearing assembly 200. For example, the thrust-bearing assembly 200 may be primarily configured to exhibit relatively high wear resistance. Additionally, the thrust-bearing assembly 200 may be secondarily configured to exhibit conformity. As such, the thrust-bearing assembly 200 may include more of the first tilting pads 204A (if configured to satisfy the primary configuration) than the second tilting pads 204B (if configured to satisfy the secondary configuration).

In an embodiment, the thrust-bearing assembly 200 may include more first tilting pads 204A than the one or more second tilting pads 204B. In such an embodiment, at least some (e.g., each) of the first tilting pads 204A may be positioned on the support ring 102 to be circumferentially adjacent to at least one other first tilting pad 204A. For example, the bearing assembly 200 may include one or more second tilting pads 204B that are equidistantly spaced about a rotation axis 206 (e.g., generally spaced about 30°, about 45°, about 60°, about 72°, about 90°, about 120°, or about 180° about the axis 206). The bearing assembly 200 also includes one or more of the first tilting pads 204A (e.g., two first tilting pads 204A, three first tilting pads 204A) positioned between adjacent second tilting pads 204B. In an embodiment, the thrust-bearing assembly 200 may include more second tilting pads 204B than first tilting pads 204A. In such an embodiment, at least some (e.g., each) of the second tilting pads 204B may be positioned on the support ring 202 to be circumferentially adjacent to at least one other second tilting pad 204B. For example, the bearing assembly 200 may include one or more first tilting pads 204A that are equidistantly spaced about the axis 206 and one or more second tilting pads 204B positioned between adjacent first tilting pads 204B. The exact arrangement of the tilting pads 104 may be selected based on the number of each type of tilting pad relative to another type of tilting pads, the size of the bearing surfaces (e.g., first superhard bearing surface 208A and/or second bearing surface 208B), and/or the requirements of the thrust-bearing assembly 200. In an embodiment, the first tilting pads 204A may be evenly spaced relative to each other and/or the second tilting pads 204B may be evenly spaced relative to each other (e.g., to create balance).

Figure 3:
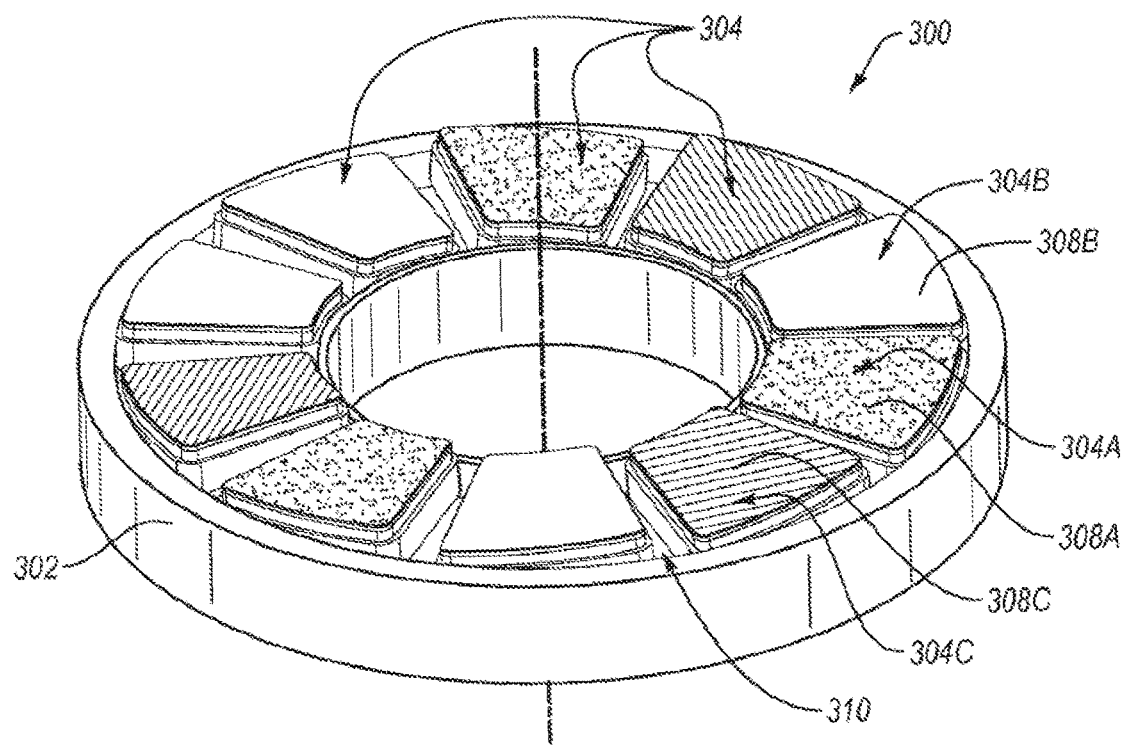
FIG. 3 is an isometric view of a tilting pad thrust-bearing assembly, according to an embodiment.

FIG. 3 is an isometric view of a tilting pad thrust-bearing assembly 300, according to an embodiment. The thrust-bearing assembly 300 may be substantially similar to the thrust-bearing assembly 100 shown in FIG. 1A. For example, the thrust-bearing assembly 300 may include a support ring 302 having a channel 310 formed therein. The channel 310 may be configured to receive a plurality of tilting pads 304. The support ring 302 may be formed from any of the support ring materials disclosed herein.

The tilting pads 304 may include one or more first tilting pads 304A, one or more second tilting pads 304B, and one or more third tilting pads 304C. Each of the first tilting pads 304A may include a first superhard bearing surface 308A having a first material, each of the second tilting pads 304B may include a second bearing surface 308B having a second material, and each of the third tilting pads 304C may include a third bearing surface 308C having a third material. The first material may include a superhard material including a material that is different from the second material, and the third material may include a material that is different from the first material and the second material. For example, the bearing surface of the tilting pad that includes the hardest material may prevent wear on the bearing surfaces of the other tilting pads when the bearing surfaces of all the tilting pads contact another bearing surface, such as during non-hydrodynamic or partial hydrodynamic operation.

Thus, the thrust-bearing assembly 300 may include the one or more first tilting pads 304A, the one or more second tilting pads 304B, and the plurality of third tilting pads 304C, wherein each of the plurality of tilting pads 304A-C includes a different material, respectively. For example, the thrust-bearing assembly 300 may be configured to include a wear resistant bearing surface. As such, the first material may include a PCD table or another wear resistant material. The thrust-bearing assembly 300 may also be configured to reduce costs. As such, the second material may include tungsten carbide or another suitable material. The thrust-bearing assembly 300 may also be configured to exhibit a relatively high thermal conductivity. As such, the third material may include copper or another suitable material. While the illustrated embodiment shows an equal number of the first tilting pads 304A, the second tilting pads 304B, and the third tilting pads 304C, in other embodiments the tilting pads 304 may include more of at least one type of tilting pad (e.g., the first tilting pads 304A, the second tilting pads 304B, or the third tilting pads 304C) than another type of tilting pad.

The first tilting pads 304A, the second tilting pads 304B, and the third tilting pads 304C may have any suitable arrangement on the support ring 302. For example, each first tilting pad 304A may be positioned on the support ring 302 between a circumferentially adjacent second tilting pad 304B and a circumferentially adjacent third tilting pad 304C. Each of the second tilting pads 304B and the third tilting pads 304C may be similarly positioned. However, it is understood that the first tilting pads 304A, the second tilting pads 304B, and the third tilting pads 304C may have other arrangements. For example, at least one of the first tilting pads 304A may be positioned on the support ring 302 to be circumferentially adjacent to at least one other first tilting pad 304A. Alternatively, the tilting pads 304 may have a random arrangement. The exact arrangement of the tilting pads 304 may be selected based on the number of each type of tilting pad relative to another type of tilting pads, the size of the respective bearing surfaces, and/or the requirements of the thrust-bearing assembly 300. In an embodiment, the first tilting pads 304A may be evenly spaced from each other, the second tilting pads 304B may be evenly spaced from each other, and/or the third tilting pads 304C may be evenly spaced from each other (e.g., to create balance).

In another embodiment, the tilting pads 304 may include additional tilting pads. For example, the tilting pads 304 may include a plurality of fourth tilting pads, a plurality of fifth tilting pads, etc. In an embodiment, each of the tilting pads of the tilting pads 304 may include a bearing surface having a different material.

Figure 4A:
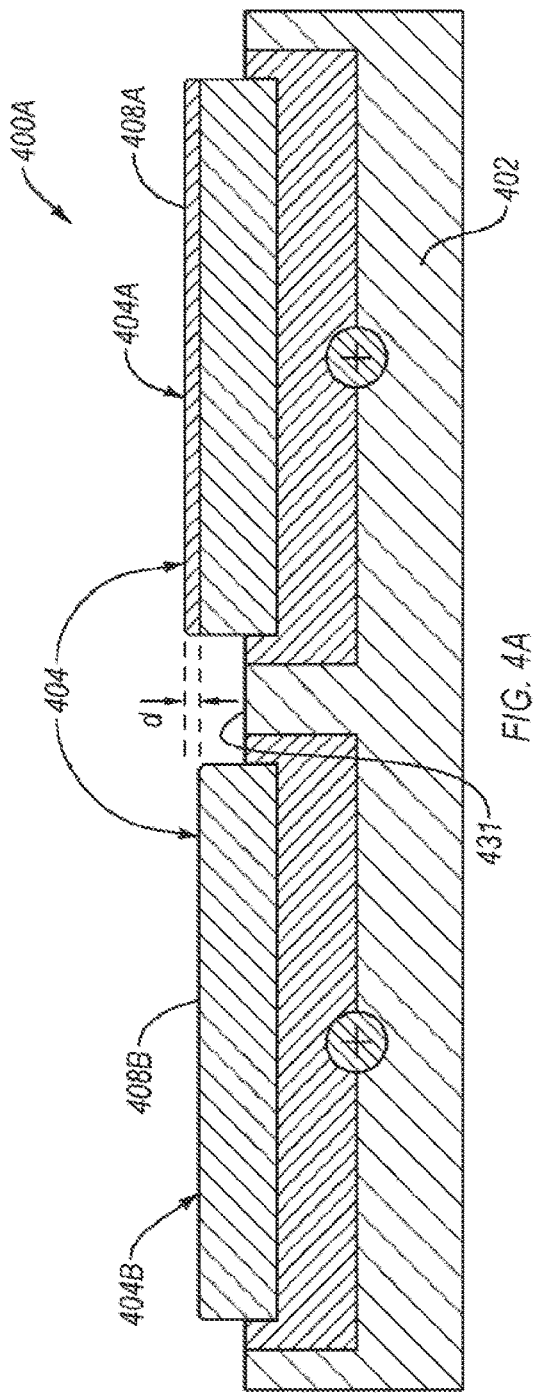
FIG. 4A is a cross-sectional view of a portion of a passive tilting pad thrust-bearing assembly, according to an embodiment.

FIG. 4A is a cross-sectional view of a portion of a passive tilting pad thrust-bearing assembly 400A, according to an embodiment. The thrust-bearing assembly 400A is similar to the thrust-bearing assembly 100 shown in FIG. 1A in that the thrust-bearing assembly 400A includes a support ring 402 and a plurality of tilting pads 404 tilted and/or tiltably secured to the support ring 402. The tilting pads 404 may include one or more first tilting pads 404A and one or more second tilting pads 404B. The first tilting pads 404A may include a first superhard bearing surface 408A having a first material and the second tilting pads 404B may include a second bearing surface 408B having a second material. The first material may include a superhard material and the second material may include a material that is different than the first material.

In the illustrated embodiment, when the tilting pads 404 are not tilted, the first superhard bearing surfaces 408A of the first tilting pads 404A may be spaced farther from a top surface 431 of the support ring 402 than the second bearing surface 408B of the second tilting pads 404B by an offset distance "d." As such, the first superhard bearing surfaces 408A may support substantially the entire load (e.g., by contacting opposing bearing surfaces) when a fluid film does not exist between the bearing surfaces 408B (and, optionally, 408A) and an opposing bearing surface (not shown). For example, the fluid film may not exist between the bearing surfaces 408B (and, optionally, 408A) at relatively low rotation speeds and/or at relatively high load capacities (e.g., start-up and shut-down). Configuring the thrust-bearing assembly 400A such that the first superhard bearing surface 408A contact the opposing bearing surface (e.g., under non-hydrodynamic operating conditions) may prolong the life of the second tilting pads 404B.

In an embodiment, the offset distance "d" may be selected to be less than the expected thickness of the fluid film that develops between the bearing surfaces 408A and 408B and the opposing bearing surface at relatively high rotation speeds and/or relatively low loads. For example, at relatively high rotation speeds, the tilting pads 404B (and, optionally, 404A) tilt such that the fluid film develops between the bearing surfaces 408A and 408B and the opposing bearing surface. As such, the first superhard bearing surfaces 408A stop supporting substantially the entire load by contacting opposing bearing surfaces and the first tilting pads 404A and the second tilting pads 404B share in supporting substantially the entire load through fluid film support.

Figure 4B:
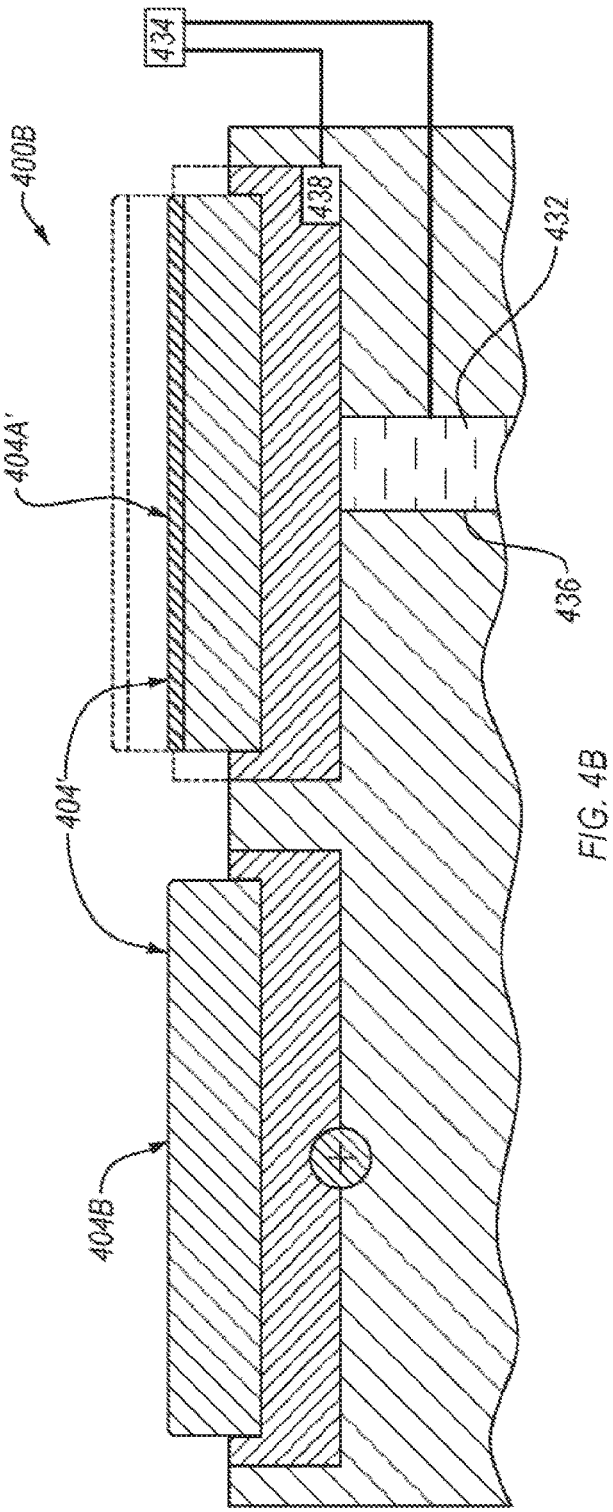
FIG. 4B is a cross-sectional view of a portion of an active tilting pad thrust-bearing assembly, according to an embodiment.

FIG. 4B is a cross-sectional view of a portion of an active tilting pad thrust-bearing assembly 400B, according to an embodiment. The thrust-bearing assembly 400B may be substantially similar to the thrust-bearing assembly 400A provided in FIG. 4A. However, the thrust-bearing assembly 400B includes an active configuration that selectively positions (e.g., raises or lowers) at least some of the bearing pads 404'. The bearing pads 404' may include one or more bearing pads 404A' and one or more tilting pads 404B. In an embodiment, at least one of the one or more bearing pads 404A' and/or at least one of the one or more tilting pads 404B may be raised or lowered by one or more actuators 432 (e.g., individually or collectively) that is operably coupled to a control system 434. For example, the one or more actuators 432 may be an electro-mechanical actuator, a magnetically-driven actuator, a hydraulic actuator, a pneumatic actuator, or another suitable system. In the illustrated embodiment, the support ring 402 may include an opening or recess 436 in which the one or more actuators 432 may be operably coupled to the pads 404A' and/or the tilting pads 404B.

The active thrust-bearing assembly 400B may include at least one sensor 438 applied to a component of the thrust-bearing assembly 400B, such as at least one, some, or all of the bearing pads 404'. In an embodiment, the at least one sensor 438 may include a force sensor configured to detect a force applied to one or more of the bearing pads 404'. A large force (e.g., drag, high load) detected by the force sensor may indicate that one or more of the bearing pads 404' may be contacting opposing bearing surfaces (not shown). The force sensor may include, for example, a strain gauge, an encoder, a piezoresistive strain gauge, an accelerometer, a capacitive force sensor, any other suitable sensor, or combinations thereof. Additionally or alternatively, the at least one sensor 438 may include a rotation sensor operably configured to detect or anticipate a rotation speed of the thrust-bearing assembly 400B or a runner/rotor used in combination with the thrust-bearing assembly 400B.

As shown in FIG. 4B (shown using dashed lines), when relatively high forces and/or relatively low rotation speeds are detected or anticipated, the bearing pads 404A' may be raised such that the bearing pads 404A' support substantially the entire load by direct contact with the opposing bearing surfaces. As shown in FIG. 4B (shown using solid lines), when relatively low forces and/or relatively high rotation speeds are detected or anticipated, at least one of the bearing pads 404A' may be lowered such that the tilting pads 404B support at least a portion of (e.g., substantially) the entire load through fluid film (i.e., hydrodynamic operation). Optionally, the bearing pads 404A' may lower and tilt to aid in hydrodynamic operation and support part of the load. Additionally or alternatively, when relatively high forces and/or relatively low rotation speeds are detected or anticipated, at least one of the tilting pads 404B may be lowered such that the pads 404A' support substantially the entire load. Similarly, when relatively low forces and/or relatively high rotation speeds are detected or anticipated, the tilting pads 404B may be raised such that the bearing pads 404A' and the tilting pads 404B share in supporting substantially the entire load.

Figure 5A:
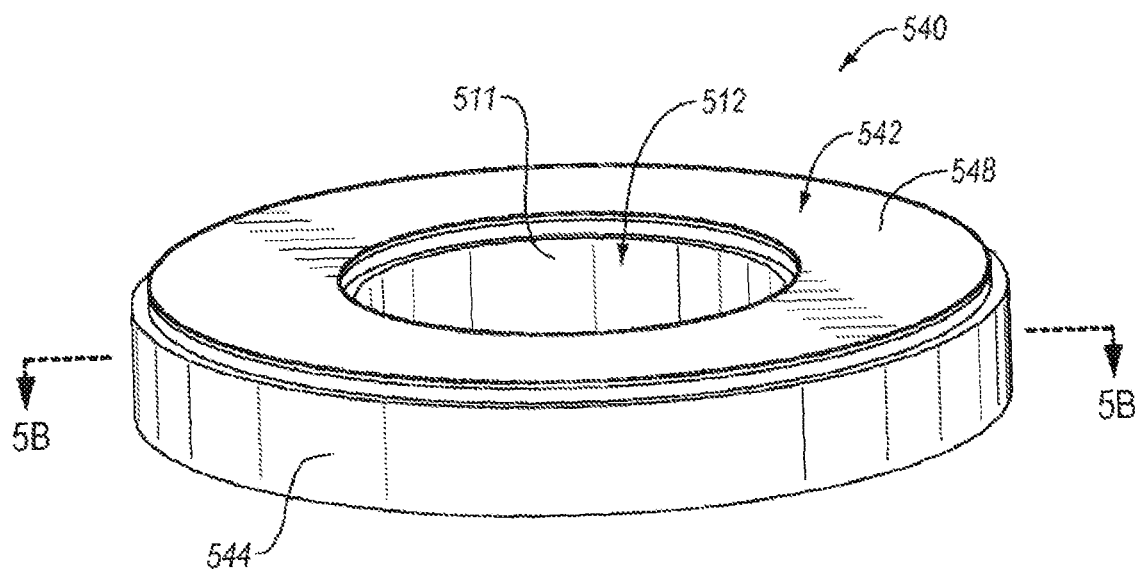
FIGS. 5A and 5B are isometric and isometric cross-sectioned views, respectively, of an opposing thrust-bearing assembly including an at least substantially continuous bearing element, according to an embodiment.
Figure 5B:
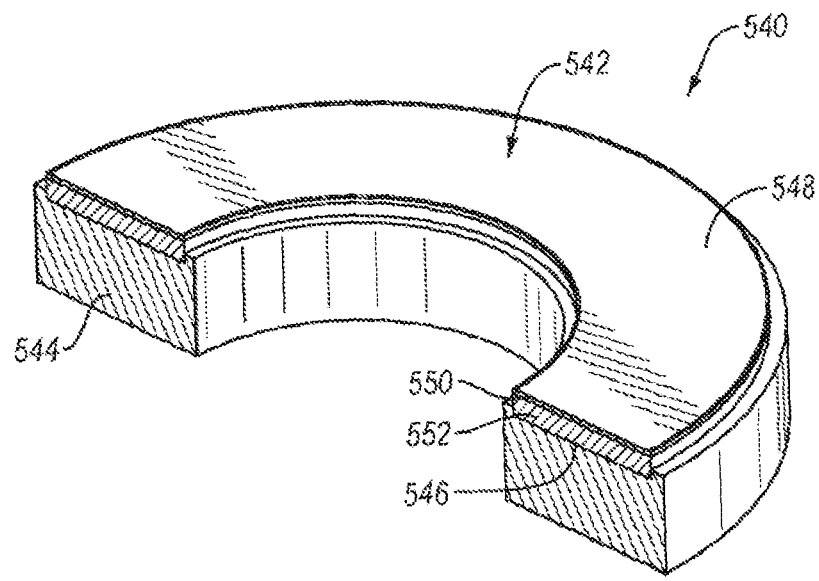

FIGS. 5A and 5B are isometric and isometric cross-sectioned views, respectively, of an opposing thrust-bearing assembly 540 including a substantially continuous bearing element 542, according to an embodiment. The thrust-bearing assembly 540 may include a support ring 544 having an inner peripheral surface 511 defining a hole 512 through which a shaft (not shown) may extend. The support ring 544 may be made from the same materials as the support ring 102 provided in FIG. 1A. The support ring 544 may include an annular slot 546 (FIG. 5B) configured to receive a corresponding substantially continuous bearing element 542.

The substantially continuous bearing element 542 includes a substantially continuous bearing surface 548. The substantially continuous bearing element 542 is attached to the support ring 544 in a fixed position. For example, the substantially continuous bearing element 542 is at least partially received by the annular slot 546 and mounted to the support ring 544. The substantially continuous bearing element 542 may be secured at least partially within the annular slot 546 of the support ring 544 by brazing, press-fitting, welding, using an adhesive, using fasteners, clamping, using other mechanical attachments, using another suitable technique, or combinations thereof. The substantially continuous bearing surface 548 may include superhard materials, non-superhard materials, or combinations thereof. For example, the substantially continuous bearing element 542 may be formed of a superhard table 550 (e.g., an unleached or an at least partially leached PCD table) bonded to a substrate 552. In an embodiment, the substantially continuous bearing surface 548 may include a material that is harder than all of the bearing surfaces of the opposing tilting pads, harder than at least one of the bearing surfaces of the opposing tilting pads, softer than all of the bearing surfaces of the opposing tilting pads, or softer than at least one of the bearing surfaces of the opposing tilting pads.

In an embodiment, the substantially continuous bearing element 542 and/or the substantially continuous bearing surface 548 (e.g., the superhard table 550) may be formed from a single element (e.g., a continuous bearing element and/or a continuous bearing surface). In an embodiment, the substantially continuous bearing element 542 and/or the substantially continuous bearing surface 548 may include a plurality of bearing elements that collectively form the substantially continuous bearing element 542 and/or the substantially continuous bearing surface 548 (e.g., a substantially continuous bearing element and/or substantially continuous bearing surface). In an embodiment, a coating may be applied to a plurality of bearing elements to form a continuous bearing surface. In an embodiment, the thrust-bearing assembly 540 may include a plurality of circumferentially spaced bearing elements (e.g., sliding bearing elements) instead of the substantially continuous bearing element 542.

Examples of substantially continuous bearing elements that may be used for the substantially continuous bearing element 542 are disclosed in U.S. Pat. No. 7,896,551, the disclosure of which is incorporated herein, in its entirety, by this reference.

Figure 6A:
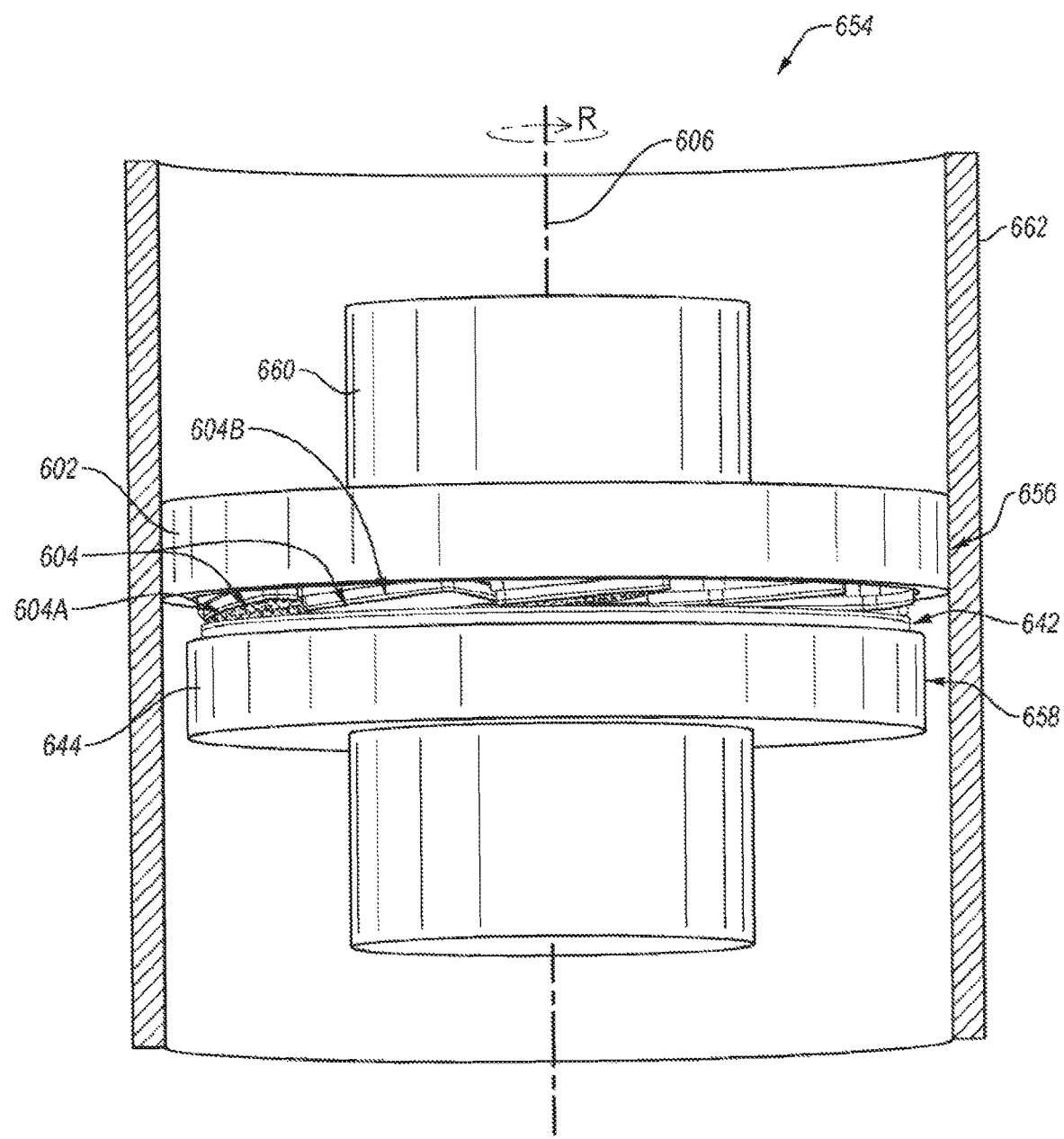

FIGS. 6A and 6B are isometric and isometric cross-sectional views, respectively, of a thrust-bearing apparatus 654, according to an embodiment. Referring to FIG. 6A, the thrust-bearing apparatus 654 may include a thrust-bearing assembly that forms a stator 656 and another bearing assembly that forms a rotor 658. In the illustrated embodiment, the stator 656 includes a tilting-pad thrust-bearing assembly (e.g., the tilting pad thrust-bearing assembly 100, 200, 300, 400A, or 400B) and the rotor 658 includes an opposing thrust-bearing assembly (e.g., the opposing thrust-bearing assembly 540). The terms "rotor" and "stator" refer to rotating and stationary components of the thrust-bearing apparatus 654, respectively, although the rotating and stationary status of the illustrated embodiment may also be reversed. Any of the embodiments for thrust-bearing assemblies disclosed herein may be used in the thrust-bearing apparatus 654.

The stator 656 may include a support ring 602 and a plurality of tilting pads 604 mounted or otherwise attached to the support ring 602. The plurality of tilting pads 604 may include one or more first tilting pads 604A and one or more second tilting pads 604B. Each of the first tilting pads 604A may include a first superhard bearing surface (not shown) that includes a first material and each of the second tilting pads 604B may include a second bearing surface (not show) that includes a second material. The first material may include a superhard material and the second material may include a material that is different than the first material. Each of the tilting pads 604 may be tilted and/or tilt relative to a rotational axis 606 of the thrust-bearing apparatus 654 and/or one or more surfaces of the support ring 602. The tilting pads 604 may be fixed at a particular tilt, may be manually adjusted to exhibit a particular tilt, may self-establish at a particular tilt, or may be otherwise configured. The stator 656 may include a passive configuration or an active configuration. Any of the embodiments shown in FIGS. 1A-4B or described herein may be used as the stator 656.

The rotor 658 may include a support ring 644 and a substantially continuous bearing element 642 (i.e., an at least substantially continuous bearing element) mounted or otherwise secured to the support ring 644. The substantially continuous bearing element 642 includes a substantially continuous bearing surface (i.e., an at least substantially continuous bearing surface, not shown). The continuous superhard bearing surface is generally adjacent to the bearing surfaces of the tilting pads 604. A fluid film 664 (FIG. 6B) may develop between the continuous bearing surface and the bearing surface of the tilting pads 604. The substantially continuous bearing surface may be formed from a material that is substantially the same as the first material, the second material, or another suitable material. Any of the embodiments disclosed herein (e.g., FIGS. 5A and 5B) may be used as the rotor 658.

As shown in FIG. 6A, a shaft 660 may be coupled to the support ring 644 and operably coupled to an apparatus (e.g., a down hole drilling motor) capable of rotating the shaft section 660 in a direction R (or in an opposite direction). For example, the shaft 660 may extend through and may be secured to the support ring 644 of the rotor 658 by press-fitting or a threaded connection that couples the shaft 660 to the support ring 644, or by using another suitable technique.

A housing 662 may be secured to the support ring 602 of the stator 656 by, for example, press-fitting or threadly coupling the housing 662 to the support ring 602, and may extend circumferentially about the shaft 660, the stator 656, and the rotor 658.

The operation of the thrust-bearing apparatus 654 is discussed in more detail with reference to FIG. 6B. FIG. 6B is a partial cross-sectional schematic representation in which the shaft 660 and housing 662 are not shown for clarity. In operation, lubrication, drilling fluid, mud, or some other fluid may be pumped between the shaft 660 and the housing 662, and between the tilting pads 604 and the substantially continuous bearing element 642. More particularly, rotation of the rotor 658 at a sufficiently high rotation speed and/or sufficiently low thrust-loads may allow a fluid film 664 to develop between the bearing surfaces of the tilting pads 604 and the continuous superhard bearing surface. The fluid film 664 may develop under certain operational conditions in which the rotation speed of the rotor 658 is sufficiently great and the thrust-load is sufficiently low.

Under certain operational conditions, the pressure of the fluid film 664 may be sufficient to substantially prevent contact between the bearing surfaces of the tilting pads 604 and the substantially continuous bearing surface and thus, may substantially reduce wear of the continuous superhard bearing surface and the bearing surfaces of the tilting pads 604. When the thrust loads exceed a certain value and/or the rotation speed of the rotor 658 is reduced, the pressure of the fluid film 664 may not be sufficient to substantially prevent the bearing surfaces of the tilting pads 604 and the substantially continuous bearing surface from contacting each other. Under such operational conditions, the thrust-bearing apparatus 654 is not operated as a hydrodynamic bearing. Thus, under certain operational conditions, the thrust-bearing apparatus 654 may be operated as a hydrodynamic bearing apparatus and under other conditions the thrust-bearing apparatus 654 may be operated so that bearing surfaces of the tilting pads 604 and the continuous bearing element 642 contact each other during use. As such, at least one of the first superhard bearing surfaces of the first tilting pads 604A, the second bearing surfaces of the second tilting pads 604B, and/or substantially continuous bearing surface may comprise superhard materials that are sufficiently wear-resistant to accommodate repetitive contact with each other, such as during start-up and shut-down of a system employing the thrust-bearing apparatus 654 or during other operational conditions not favorable for forming the fluid film 664.

Figure 7:
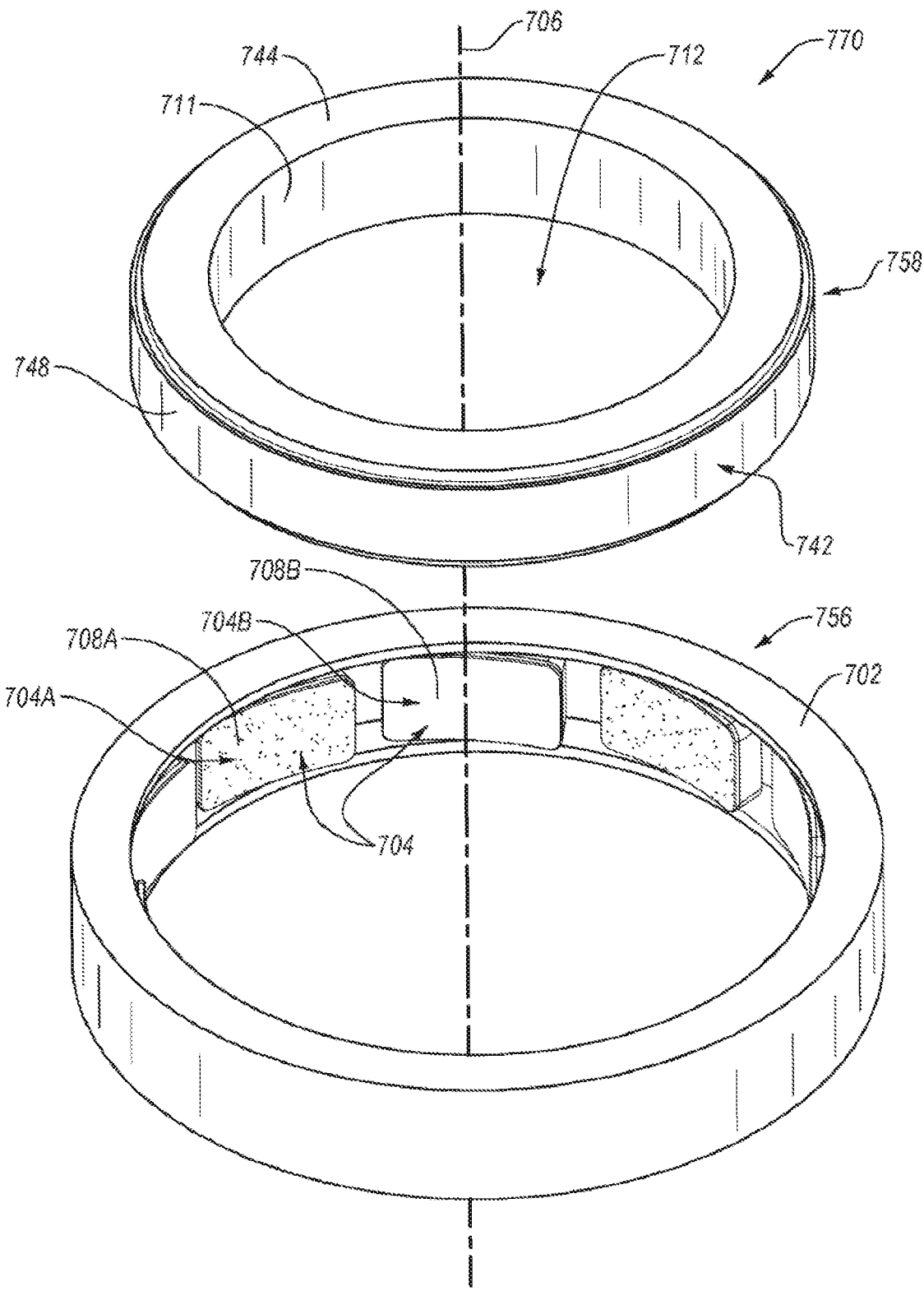
FIG. 7 is an exploded isometric view of a radial bearing apparatus, according to an embodiment.

The concepts used in the thrust-bearing assemblies and apparatuses described herein may also be employed in radial bearing assemblies and apparatuses. FIG. 7 is isometric view of a radial bearing apparatus 770, according to an embodiment. The radial bearing apparatus 770 may include an inner race 758 (e.g., a runner or rotor). The inner race 758 may include a support ring 744 including an inner peripheral surface 711 defining an hole 712 for receiving a shaft (not shown). The inner race 758 may also include a substantially continuous bearing element 742 mounted to the support ring 744. The substantially continuous bearing element 742 may include a convexly-curved substantially continuous bearing surface 748 and may be formed from any of the materials previously discussed for use with the substantially continuous bearing element 542 (FIG. 5). The support ring 744 of the inner race 758 may include a circumferentially extending recess (not shown) that receives the substantially continuous bearing element 742. The continuous superhard bearing element 742 may be secured within the recess or otherwise secured to the support ring 744 by brazing, press-fitting, using fasteners, or another suitable technique.

The radial bearing apparatus 770 may further include an outer race 756 (e.g., a stator) configured to extend about and/or receive the inner race 758. The outer race 756 may include a support ring 702 extending about a rotation axis 706. The outer race 756 may include a plurality of circumferentially-spaced tilting pads 704. The tilting pads 704 include one or more first tilting pads 704A and one or more second tilting pads 704B. Each of the first tilting pads 704A includes a first superhard bearing surface 708A having a first material and each of the second tilting pads 704B includes a second bearing surface 708B having a second material. The first material includes a superhard material and the second material is different than the first material. The bearing surfaces 708A and 708B may be substantially planar, although in other embodiments the bearing surfaces 708A and 708B may be a concavely-curved to generally correspond to shapes of convexly-curved substantially continuous bearing surface 748. Each tilting pad 704 may be tilted in a manner that facilies sweeping in of a lubricant or other fluid to form the fluid film between the inner race 758 and the outer race 756. Each tilting pad 704 may be tilted and/or tilt about an axis that is generally parallel to the rotation axis 706 (e.g., the central axis). As a result, each tilting pad 704 may be tilted at an angle relative to the inner and outer surfaces of the support ring 702 and in a circumferential fashion such that the leading edges of the tilting pads 704 are about parallel to the axis 706.

Rotation of a shaft (not shown) secured to the inner race 758 may affect rotation of the inner race 758 relative to the outer race 756. Drilling fluid or other fluid or lubricant may be pumped between the bearing surfaces 708A and 708B and the substantially continuous bearing surface 748. As previously described with respect to the hydrodynamic tilting pad bearing apparatus 654, at a fluid film may develop between the bearing surfaces 708A and 708B and the substantially continuous bearing surface 748, and may develop sufficient pressure to maintain the bearing surfaces 708A and 708B and the substantially continuous bearing surface 748 apart from each other. Accordingly, wear on the bearing surfaces 708A and 708B and the substantially continuous bearing surface 748 may be reduced compared to when direct contact between bearing surfaces 708A and 708B and the substantially continuous bearing surface 748 occurs. It should be noted that in other embodiments, the radial bearing apparatus 770 may be configured as a journal bearing. In such an embodiment, the inner race 758 may be positioned eccentrically relative to the outer race 756.

Figure 8:
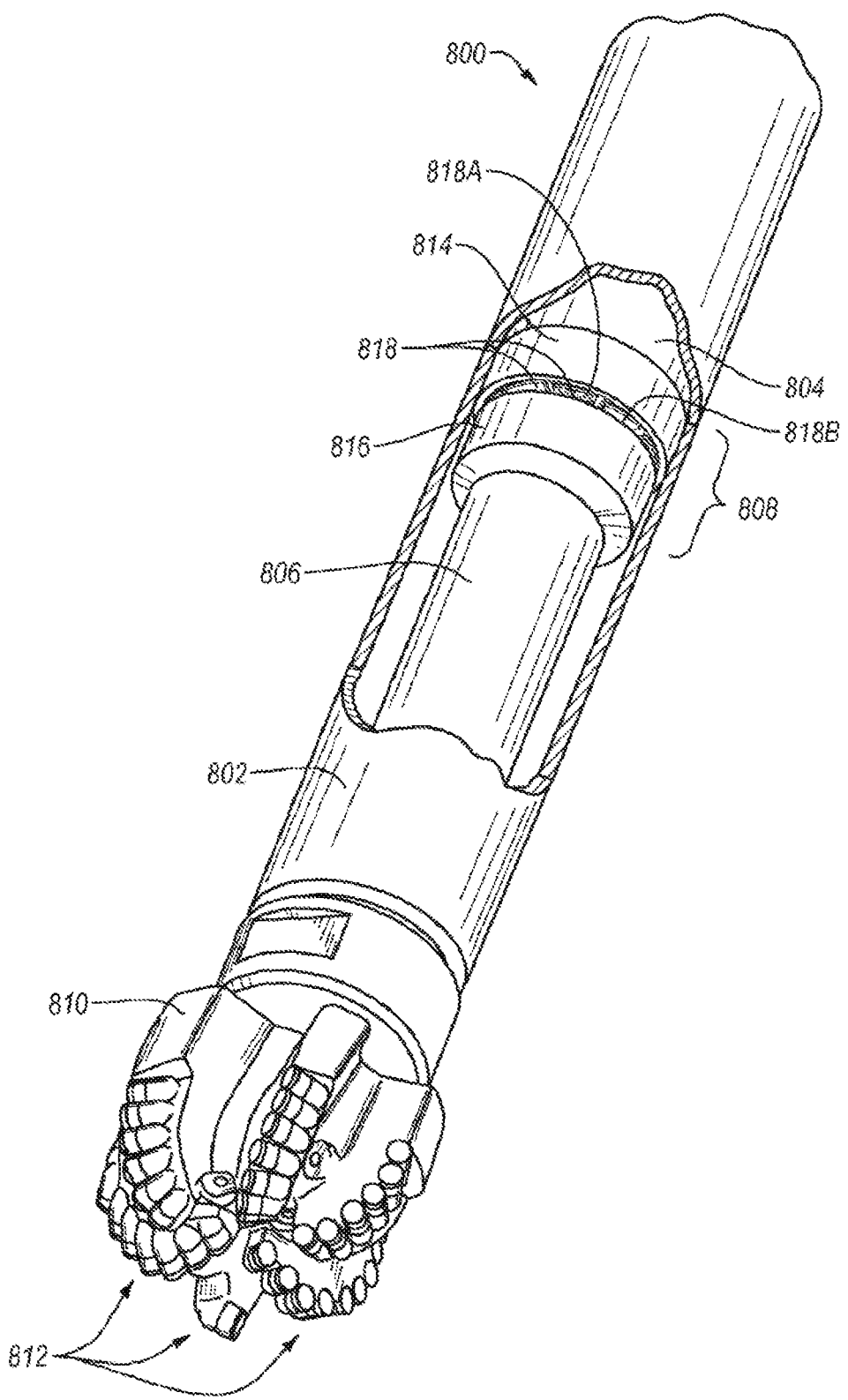
FIG. 8 is a schematic isometric cutaway view of an embodiment of a subterranean drilling system according to an embodiment that uses a thrust-bearing apparatus.

Any of the embodiments for bearing apparatuses discussed above may be used in a subterranean drilling system. FIG. 8 is a schematic isometric cutaway view of an embodiment of a subterranean drilling system 800 according to an embodiment that uses a thrust-bearing apparatus. The subterranean drilling system 800 includes a housing 802 enclosing a downhole drilling motor 804 (i.e., a motor, turbine, or any other device capable of rotating an output shaft) that is operably connected to an output shaft 806. A thrust-bearing apparatus 808 is operably coupled to the downhole drilling motor 804. The thrust-bearing apparatus 808 may be configured as any of the previously described thrust-bearing apparatus embodiments. A rotary drill bit 810 configured to engage a subterranean formation and drill a borehole is connected to the output shaft 806. The rotary drill bit 810 is shown as so-called "fixed cutter" drill bit including a plurality of blades having a plurality of PDC cutting elements 812 mounted thereon. However, in other embodiments, the rotary drill bit 810 may be configured as a roller cone bit including a plurality of roller cones.

The thrust-bearing apparatus 808 includes a stator 814 that does not rotate and a rotor 816 that is attached to the output shaft 806 and rotates with the output shaft 806. The stator 814 may include a plurality of circumferentially spaced tilting pads 818. For example, each of the tilting pads 818 may at least include one or more first tilting pads 818A and one or more second tilting pads 818B. The first tilting pads 818A may include a first superhard bearing surface (not shown) that includes a first material and the second tilting pads 818B may include a second bearing surface (not shown) that includes a second material. The first material may include a superhard material and the second material may be different than the first material. The stator 814 may include any of the features illustrated, described, or disclosed herein (e.g., with respect to FIGS. 1A to 4B). The rotor 816 may include a substantially continuous bearing element such as shown in the thrust-bearing assemblies shown in FIGS. 5A and 5B or as otherwise disclosed herein.

In operation, drilling fluid may be circulated through the downhole drilling motor 804 to generate torque and effect rotation of the output shaft 806 and the rotary drill bit 810 attached thereto so that a borehole may be drilled. A portion of the drilling fluid is also used to lubricate opposing bearing surfaces of the stator 814 and rotor 816. As the borehole is drilled, pipe sections may be connected to the subterranean drilling system 800 to form a drill string capable of progressively drilling the borehole to a greater depth within the earth.

While various aspects and embodiments have been disclosed herein, other aspects and embodiments are contemplated. The various aspects and embodiment disclosed herein are for purposes of illustration and are not intended to be limiting. Additionally, the words "including," having," and variants thereof (e.g., "includes" and "has") as used herein, including the claims, shall be open ended and have the same meaning as the word "comprising" and variants thereof (e.g., "comprise" and "comprises").

The invention claimed is:
1. A system, comprising:
a shaft; and
a bearing apparatus including:
a first bearing assembly including:
a first support ring defining a first hole that receives the shaft; and
one or more bearing elements extending circumferentially about an axis, the one or more bearing elements including a bearing surface, the one or more bearing element secured to the first support ring; and
a second bearing assembly including:
a second support ring defining a second hole that receives the shaft; and
a plurality of tilting pads distributed circumferentially about the axis, each of the plurality of tilting pads tilted and/or tiltably secured relative to the second support ring, the plurality of tilting pads including:
one or more first tilting pads, each of the one or more first tilting pads including a first superhard bearing surface having a first material, the first material including a superhard material; and
one or more second tilting pads that are distinct from the one or more first tilting pads, each of the one or more second tilting pads including a second bearing surface comprising a second material that is different than the first material; and wherein the shaft is secured to the first support ring or the second support ring.

2. The system of claim 1, wherein the one or more bearing elements includes a superhard material.

3. The system of claim 1, wherein the one or more bearing elements includes a plurality of sliding bearing elements.

4. The system of claim 1, wherein the one or more bearing elements includes an at least substantially continuous bearing element.

5. The system of claim 1, wherein the shaft is secured to the first support ring or the second support ring by press-fitting or a threaded connection.

6. The system of claim 1, wherein the first material includes polycrystalline diamond.

7. The system of claim 1, wherein the first material includes at least one of silicon carbide, silicon nitride, a reaction bonded ceramic, a carbide, or boron nitride.

8. The system of claim 1, wherein the second material is a superhard material.

9. The system of claim 1, wherein the second material is a non-superhard material.

10. The system of claim 9, wherein the non-superhard material includes at least one of a ceramic, a polymer, or a composite.

11. The system of claim 9, wherein the non-superhard material includes high carbon steel, low carbon steel, poly(aryl ether ketone), bronze, or white metal.

12. The system of claim 1, wherein a position of the first superhard bearing surface is adjustable depending on operation conditions of the bearing apparatus.

13. The system of claim 1, further comprising an apparatus coupled to the shaft, the apparatus configured to rotate the shaft.

14. The system of claim 1, further comprising a housing that is coupled to the first support ring or the second support ring that is not secured to the shaft.

15. The system of claim 1, further comprising a drill bit connected to the shaft.

16. A system, comprising:
a shaft;
a housing; and
a bearing apparatus including:
a rotor including:
a first support ring secured to the housing, the first support ring defining a first hole that receives the shaft; and
one or more bearing elements extending circumferentially about an axis, the one or more bearing elements including a bearing surface, the one or more bearing element secured to the first support ring; and
a stator including:
a second support ring defining a second hole, wherein the second hole receives and is secured to the shaft; and
a plurality of tilting pads distributed circumferentially about the axis, each of the plurality of tilting pads tilted and/or tiltably secured relative to the second support ring, the plurality of tilting pads including:
one or more first tilting pads, each of the one or more first tilting pads including a first superhard bearing surface having a first material, the first material including a superhard material; and
one or more second tilting pads that are distinct from the one or more first tilting pads, each of the one or more second tilting pads including a second bearing surface comprising a second material that is different than the first material; and wherein the shaft is secured to the first support ring and the housing is secured to the second support ring.

17. The system of claim 16, further comprising a downhole drilling motor enclosed in the housing, the downhole drilling motor coupled to the shaft, the downhole drilling motor configured to rotate the shaft.

18. A method of operating a system, the method comprising:
providing a bearing apparatus, the bearing apparatus including:
a first bearing assembly including:
a first support ring defining a first hole that receives the shaft; and
one or more bearing elements extending circumferentially about an axis, the one or more bearing elements including a bearing surface, the one or more bearing element secured to the first support ring; and
a second bearing assembly including:
a second support ring defining a second hole that receives the shaft; and
a plurality of tilting pads distributed circumferentially about the axis, each of the plurality of tilting pads tilted and/or tiltably secured relative to the second support ring, the plurality of tilting pads including:
one or more first tilting pads, each of the one or more first tilting pads including a first superhard bearing surface having a first material, the first material including a superhard material; and
one or more second tilting pads that are distinct from the one or more first tilting pads, each of the one or more second tilting pads including a second bearing surface comprising a second material that is different than the first material; and
rotating a shaft that is secured to the first support ring or the second support ring.

19. The method of claim 18, further comprising pumping lubrication, drilling fluid, mud, or another fluid between the shaft and a housing and between the one or more bearing elements and the plurality of tilting pads.

20. The method of claim 19, further comprising forming a fluid film between the one or more bearing elements and the plurality of tilting pads.

* * * * *